UNITED STATES PATENT OFFICE.

GEORGE H. WOOSTER, OF WEST NEW BRIGHTON, NEW YORK.

COMPOSITION OF MATTER FOR PLASTERING WALLS, &c.

SPECIFICATION forming part of Letters Patent No. 367,173, dated July 26, 1887.

Application filed May 10, 1887. Serial No. 237,752. (No specimens.)

*To all whom it may concern:*

Be it known that I, GEORGE H. WOOSTER, of West New Brighton, in the county of Richmond and State of New York, have invented a new and useful Composition of Matter for Plastering Walls, &c., of which the following is a specification.

My invention relates to a composition of matter for plastering walls and other purposes, and has for its object to provide a hard finish in a pulverized state, which, when mixed with water, may be applied to a wall or used for making cornices or other decorations of a similar character used in buildings.

My invention consists of the following ingredients, prepared and combined as hereinafter set forth, viz: sulphate of lime, (gypsum,) pulverized; carbonate of lime, (as marble-dust,) pulverized, and adhesive material, also in a pulverized condition, as glue, gum-arabic, or sugar.

The sulphate and carbonate of lime may be calcined before mixing, but are preferably calcined after being mixed together.

The preferred proportions are as follows: sulphate of lime, two-thirds barrel; carbonate of lime, one-third barrel; adhesive material, five pounds; but these proportions may be varied according to the purposes or work for which the mixture may be required. A very good article may also be made by using the carbonate of lime without being calcined, especially when a quicker setting material is desired.

When the ingredients have been compounded subtantially as aforesaid, they may be kept for any length of time, and are quickly made ready for use by merely adding plain water in proper quantities, and when used for walls or ceilings might be properly designated as the "lightning-finish white coat."

It is obvious that the above method of preparing plastering for walls, cornices, &c., is a vast improvement upon the method heretofore ordinarily employed, as it avoids the necessity of preparing "white putty," made by slaking lime, straining it, and letting it stand for days to cool. This material is not only much more conveniently and expeditiously prepared, but also less room and fewer vessels are required, and, further, the preparation of the material is very cleanly.

For a lightning brown coat, sand may be added, either with or without the adhesive material.

What I claim, and desire to secure by Letters Patent, is—

1. The herein-described composition of matter to be used in plastering walls, cornices, and similar work, consisting of pulverized calcined carbonate of lime, pulverized calcined sulphate of lime, and a pulverized adhesive material, compounded, substantially as herein set forth.

2. The herein-described method of preparing a plaster for walls, cornices, and similar work, which consists in mixing pulverized carbonate of lime and pulverized sulphate of lime, calcining the mixture, and then adding thereto a pulverized adhesive material, in the proportions substantially as herein set forth.

GEO. H. WOOSTER.

Witnesses:
HUNTINGTON PAGE,
G. F. HAMLIN.